Jan. 17, 1961     A. H. SCHELDRUP     2,968,260
RAIL GUIDE CARRIAGE FOR VEHICLES
Filed Feb. 27, 1956     2 Sheets-Sheet 1
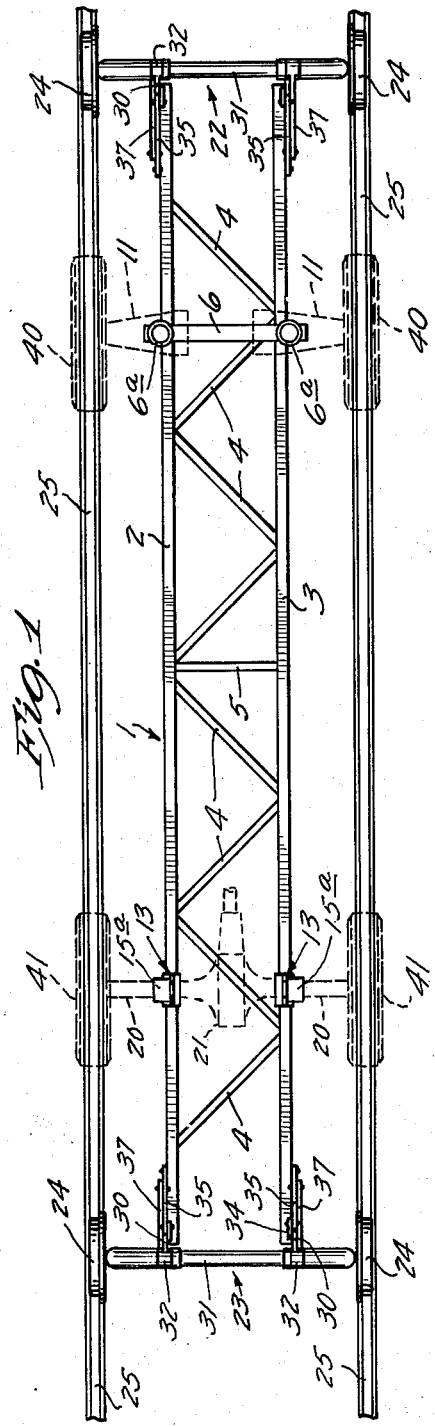
INVENTOR.
Alfred H. Scheldrup
BY
Merchant & Merchant
ATTORNEYS

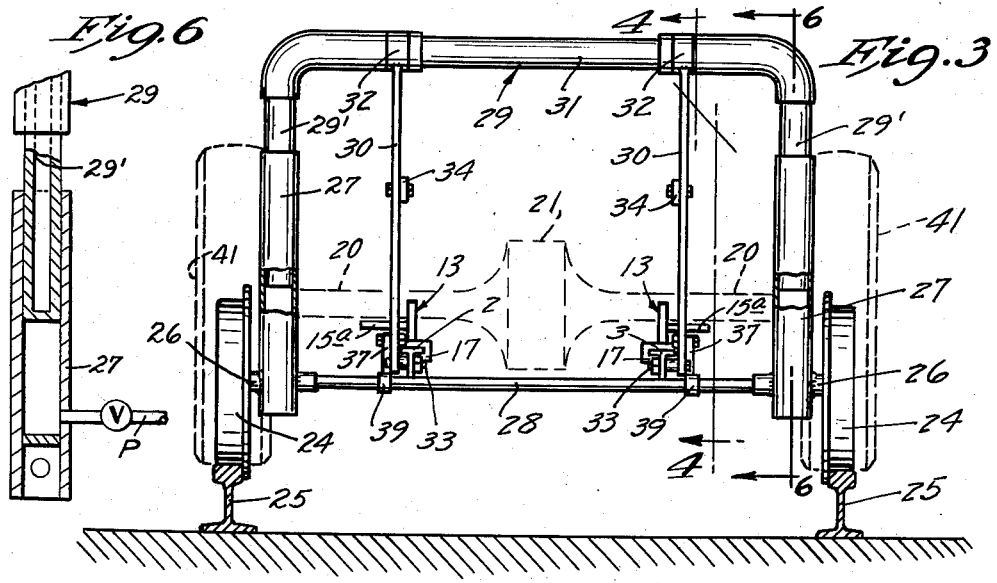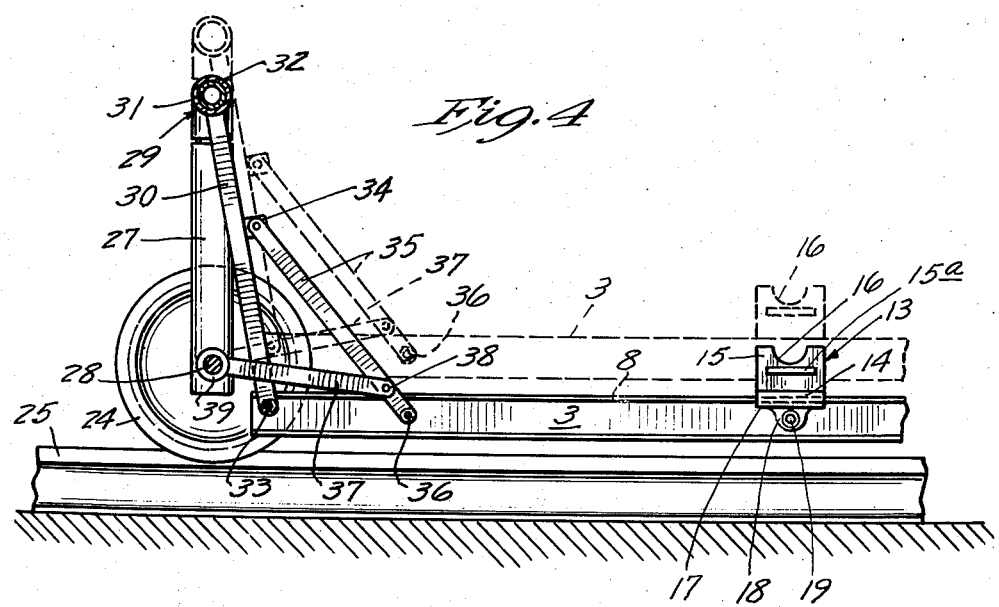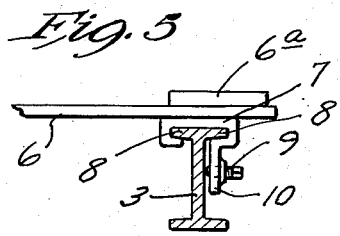

United States Patent Office
2,968,260
Patented Jan. 17, 1961

2,968,260

RAIL GUIDE CARRIAGE FOR VEHICLES

Alfred H. Scheldrup, Minneapolis, Minn.
(Box 4493, Carmel, Calif.)

Filed Feb. 27, 1956, Ser. No. 567,873

2 Claims. (Cl. 105—215)

My invention relates generally to attachments or supports for wheeled vehicles and, more particularly, to guide carriages or supports by means of which a vehicle, normally adapted for highway use is utilized to travel on railroad rails.

An important object of my invention is the provision of a vehicle supporting guide carriage which may be quickly and easily applied to a vehicle to guide movements thereof on railroad rails without the necessity of attaching special mounting adapters or like equipment to the vehicle.

Another object of my invention is the provision of a guide carriage as set forth which is readily adjustable to vehicles of varying wheel base dimensions.

Still another object of my invention is the provision of a guide carriage of the above type comprising a vehicle supporting frame and a pair of flanged wheel equipped lifting devices at opposite ends thereof, at least one of said lifting devices being easily detachable from said frame to permit the vehicle to be driven into proper position thereover, whereby, upon reconnection of the removed lifting device to the frame, said frame may be elevated to properly support the vehicle with respect to the rails.

Another object of my invention is the provision of a guide carriage as set forth in which said lifting devices are independently operable to support the front and rear wheels of the vehicle, whereby a power driven vehicle may be partially supported on underlying rails during rail travel, with a relatively large proportion of the weight of the vehicle at the end adjacent the driving wheels being applied to the underlying rails by said driving wheels, and a relatively small proportion of the weight of the opposite end of the vehicle being applied to said rails by the other wheels thereof.

Another object of my invention is the provision of a guide carriage of the type herein disclosed which can be quickly and easily placed in supporting and guide relationship to an automotive vehicle, and which will guide said vehicle on the rails of a railroad track while said vehicle is propelled by its own motive power.

Another object of my invention is the provision of a guide carriage which is relatively simple and inexpensive to produce, which is efficient in operation, and which is rugged in construction and durable in use.

The above and still further highly important objects and advantages of my invention will become apparent from the following detailed specification, appended claims and attached drawings.

Referring to the drawings, which illustrate the invention, and in which like reference characters indicate like parts throughout the several views:

Fig. 1 is a view in top plan of a guide carriage built in accordance with my invention, and showing the same mounted on a pair of railway rails;

Fig. 2 is a view in side elevation;

Fig. 3 is an enlarged view in end elevation, some parts being broken away and some parts shown in section;

Fig. 4 is a fragmentary view partly in side elevation and partly in vertical section, taken substantially on the line 4—4 of Fig. 3;

Fig. 5 is an enlarged fragmentary detail in section taken substantially on the line 5—5 of Fig. 2; and Fig. 6 is a partial section through one of the hydraulic cylinders.

In the preferred embodiment of my invention illustrated, the numeral 1 indicates, in its entirety, a generally rectangular frame comprising a pair of laterally spaced parallel side frame members 2 and 3 connected by a plurality of diagonally disposed inner frame members 4 and a transversely extending central frame member 5. A vehicle supporting platform element 6 extends transversely of the frame 1 and having spaced apart upwardly facing seats 6a and a pair of side frame member engaging feet or the like 7 each of which is mounted on its respective side frame member for sliding movements longitudinally thereof. Preferably, the side frame members 2 and 3 are made from commercially available I-beams, the feet 7 resting on the upper flanges 8 of the frame members 2 and 3. The platform element 6 and feet 7 are movable as a unit longitudinally of the frame 1, and are adapted to be releasably locked in desired set positions on the frame against said longitudinal movement. For the purpose of the present example, I provide set screws or the like 9 screw threaded through downwardly directed flanges 10 at one side of each frame member 2 and 3, the set screws engaging the adjacent side of their respective frame members to hold the platform element 6 against movement on the frame. It will be noted that only one of said setscrews 9 and flanges 10 are shown, and it should be obvious that any suitable and well-known means may be used to lock the platform element 6 and feet 7 in place on the frame.

As shown by dotted lines in Figs. 1 and 2, the platform element 6 is adapted to underlie and support the front wheel mounting mechanism 11 of a vehicle such as an automobile or the like 12. With reference to Figs. 1, 2, and 5 it will be seen that the platform element 6 is disposed toward the front end portion of the frame 1, and is provided with a pair of collars 6A which define upwardly opening sockets for reception of the front coil spring seats, not shown, but commonly found in present-day automotive vehicles. A pair of upstanding vehicle supporting elements 13 are one each mounted on a different one of the side frame members 2 and 3 in rearwardly spaced relation to the platform element 6 and for longitudinal sliding movements on their respective side frame members. The supporting elements 13 each comprise a side frame member engaging foot 14 and an upwardly projecting flange 15 that is provided with an upwardly opening semicircular notch 16. With reference to Fig. 3 it will be seen that the foot portions 14 are provided with in-turned ears 17 which engage the under surfaces of the top flange 8 of their respective side frame members 2 and 3 whereby to prevent accidental removal of the supporting elements 13 from the side frame members. With reference to Fig. 5 it will be seen that the feet 7 of the supporting platform 6 are likewise provided with inturned ears or flanges for the same purpose. Preferably, the supporting elements 13 are provided with suitable means such as depending flanges 18 and setscrews or the like 19 similar to the setscrews and flanges 9 and 10, respectively, and for a similar purpose. The upwardly opening notches 16 are adapted to receive portions of the rear axle housing 20 of the vehicle 12 at opposite sides of the differential housing portion 21 thereof, see Figs. 1 and 3. Further, the flanges 15 are provided with laterally outwardly projecting flange elements 15A that are adapted to engage the usual rear leaf spring shackle bolts of present-day automotive vehicles having leaf springs at their rear axles, to limit lateral movement of the rear end portion of the vehicle on the frame 1. Obviously, the construction of the platform supporting feet 7 and the supporting elements 13 permits either or both thereof to be adjusted longitudinally of the frame 1 so that the structure is quickly and easily adapted to vehicles of different wheel base dimensions.

Means for lifting the frame 1 into engagement with the automobile 12, and for guiding the same for rail travel, includes a pair of front and rear lifting devices 22 and 23, respectively. Inasmuch as these lifting devices are identical, but one thereof will be described in detail; namely, the rear lifting device 23. The lifting device 23 comprises a pair of laterally spaced axially aligned flanged wheels 24 that are adapted to run on railroad rails indicated at 25. The wheels 24 are journaled in suitable bearings 26 each adjacent the lower end portion of a respective fluid pressure cylinder 27 which extend in a generally vertical direction, and which are connected by a transverse tie bar or shaft or the like 28, preferably axially aligned with the wheels 24. The lifting device 23 further includes an inverted generally U-shaped member 29 the depending legs of which define pistons 29' each receivable in a different one of the cylinders 27 for vertically extending and retracting movements with respect thereto. A pair of laterally spaced rigid lifting links 30 are journaled at their upper ends to the generally horizontally disposed laterally extending portion 31 of the U-shaped member 29, as indicated at 32. The lower ends of the depending lifting links 30 are removably secured one each to the rear end of an adjacent side frame member 2 and 3 by suitable means such as nut-equipped bolts or the like 33. Each of the lifting links 30 is provided intermediate its ends with a forwardly projecting lug 34 to which is pivotally secured the upper end of one of a pair of brace members 35. The lower ends of the brace members 35 are each removably secured to adjacent side frame members 2 and 3 by nut-equipped bolts or the like 36, in forwardly spaced relationship to the anchoring bolts 33. A pair of guide links 37 are pivotally anchored one each to the lower end portion of a different one of the brace members 35 as indicated at 38 and extend rearwardly therefrom, the rear ends of the links 37 terminating in collars or the like 39 that are journaled on the transverse shaft 28.

Obviously, introduction of fluid such as air, under pressure to the cylinders 27 will cause the inverted U-shaped frames 29 to be elevated, carrying their respective ends of the frame 1 upwardly to cause engagement of the front wheel mounting mechanism 11 of the vehicle 12 by the platform element 6, and reception of the rear axle housing 20 in the notches 16 of the supporting elements 13. Inasmuch as the cylinders 27 and cooperating pistons 29' are of types in common use and in themselves do not comprise the instant invention, detailed showing and description thereof and valve means therefor is deemed unnecessary. It may be assumed that fluid, such as air, under pressure, is introduced to the cylinders in the usual manner, such as by means of the pipe P and valve V, which latter may be a conventional three-way valve, to raise the frame 1 into its operative vehicle engaging and supporting position, and released therefrom to lower the frame to its inoperative position.

When it is desired to adapt the vehicle 12 from normal highway use to rail travel, the frame 1 is disposed between the rails 25 of a selected pair thereof in parallel relation thereto at a grade crossing or any other desired point where the top of the rails 25 are substantially flush with the ground. Either one or both of the lifting devices 22 and 23, as desired, are removed from the frame by the simple expedient of removing the nut-equipped bolts 33 and 36 from engagement with the side frame members 2 and 3. Inasmuch as there are only four of these nut-equipped bolts at each end of the frame 1, disassembly of the lifting devices therefrom is a simple matter. With the lifting devices removed from the frame 1, the same rests upon the ground between the rails. The vehicle 12 is then driven longitudinally over the frame 1 and positioned intermediate the ends thereof. The lifting platform 6 and supporting elements 13 are then moved longitudinally of the frame 1 so that they are disposed under the front wheel mounting mechanism and rear axle housing respectively of the vehicle. The lifting devices 22 and 23 are then positioned with their respective flanged wheels 24 on the rails 25, and their respective lifting links 30 and brace members 35 are secured to their respective ends of the frame 1. Fluid under pressure is then introduced to the cylinders 27 of each lifting device to cause the frame 1 to be raised into operative supporting engagement with the vehicle. Preferably, the front lifting device is so manipulated that the track engaging front wheels 40 of the vehicle support approximately one-third of the weight of the front end portion of the vehicle, the other two-thirds of said weight being supported by the flanged front guide wheels 24. On the other hand, the rear lifting device is so manipulated that approximately two-thirds of the rear end portion of the vehicle is carried by the track engaging rear wheels 41 of the vehicle, the other one-third of said weight being supported by the rear guide wheels 24. This arrangement provides sufficient trackage between the rear vehicle wheels 41 and the track rails 25 for efficient operation of the vehicle on the rails without causing injury to the vehicle tires. The flanged wheels 24 at opposite ends of the frame 1 guide the vehicle on the rails and insure correct alignment between the driving wheels 41 and the rails 25 at all times, assuming that the front and rear wheels of the vehicle were correctly positioned on the rails when the frame 1 was applied thereto.

It will be noted that, with my novel guide carriage, the necessity for special fastenings or anchoring means between the vehicle 12 and the frame 1 is eliminated. The upwardly opening notches or recesses 16 are of sufficient depth to insure a rigid connection between the frame 1 and the vehicle 12. The weight of the front end of the vehicle 12 on the supporting platform 6 is sufficient to prevent displacement of the front end portion of the vehicle with respect to the frame 1 during rail travel at normal speeds.

It will be appreciated that my novel guide carriage may be utilized to support and guide road vehicles which are not power driven, as well as those that are self-propelled. In such cases, and if desired, several of my novel guide carriages may be coupled together in tandem relationship by any suitable means not shown and towed in a train behind a locomotive or, if desired, behind any power-driven vehicle mounted on another one of my novel guide carriages.

While I have shown and described a commercial embodiment of my novel guide carriage, it will be understood that the same is capable of modification without departure from the spirit and scope of the invention as defined in the claims.

What I claim is:

1. In a device of the class described, an elongated frame comprising a pair of spaced substantially parallel side frame members, a plurality of cross frame members interconnecting said side frame members, a vehicle supporting platform mounted adjacent one end of said elongated frame and longitudinally adjustable thereon, said platform having spaced apart upwardly faced seats thereon adapted to receive the front wheel mounting mechanism of an automotive vehicle, a pair of vehicle axle housing supporting elements, one on each side rail, adjacent the other end of said elongated frame and adjustably mounted thereon, each said supporting element having an upwardly facing notch for the reception of the rear axle housing of the automotive vehicle, a pair of railroad rail engaging flanged wheels adjacent each end of said elongated frame and beyond the ends thereof, an inverted U-shaped member interconnecting each pair of said wheels, link means movably and removably connecting a pair of said wheels to each end of said elongated frame, said link means including lifting means comprising an upwardly directed hydraulic cylinder and piston connected to each of said wheel interconnecting means, a first link attached to each said piston and to said frame, a second link attached to said first link intermediate the ends thereof and to the frame inwardly of the point of attachment of said first link, and a third link attached to said wheel interconnecting means and to said second link.

2. The structure as defined in claim 1, wherein said lifting means comprises a pair of spaced apart cylinders and pistons at either end of the frame and wherein the pistons of each pair are interconnected by a horizontal bar.

References Cited in the file of this patent

UNITED STATES PATENTS

| | | |
|---|---|---|
| 1,727,114 | Oechsle | Sept. 3, 1929 |
| 1,800,236 | Wasson | Apr. 14, 1931 |
| 1,948,367 | Bristol | Feb. 20, 1934 |
| 2,010,490 | Jones | Aug. 6, 1935 |
| 2,158,399 | Carter | May 16, 1939 |
| 2,478,647 | Watts et al. | Aug. 9, 1949 |
| 2,482,564 | Townsend | Sept. 20, 1949 |
| 2,551,097 | Cole | May 1, 1951 |
| 2,577,830 | Watts et al. | Dec. 11, 1951 |
| 2,588,597 | Webster et al. | Mar. 11, 1952 |
| 2,593,209 | Smith | Apr. 15, 1952 |
| 2,669,424 | Branick | Feb. 16, 1954 |

FOREIGN PATENTS

| | | |
|---|---|---|
| 504,913 | Belgium | Aug. 14, 1951 |
| 352,885 | Italy | Sept. 24, 1937 |